US 6,599,552 B2

(12) United States Patent
Andrade

(10) Patent No.: US 6,599,552 B2
(45) Date of Patent: Jul. 29, 2003

(54) GRAIN BASED DAIRY BEVERAGE

(75) Inventor: Martin Andrade, Mount Prospect, IL (US)

(73) Assignee: Nickolas Kanakaris, Algonquin, IL (US)

( * ) Notice: Subject to any disclaimer, the term of this patent is extended or adjusted under 35 U.S.C. 154(b) by 202 days.

(21) Appl. No.: 09/887,290

(22) Filed: Jun. 22, 2001

(65) Prior Publication Data

US 2002/0197378 A1 Dec. 26, 2002

(51) Int. Cl.$^7$ ................................. A23L 2/38
(52) U.S. Cl. ................... 426/584; 426/580; 426/587; 426/590; 426/593; 426/598
(58) Field of Search .................. 426/580, 590, 426/593, 584, 587

(56) References Cited

U.S. PATENT DOCUMENTS

| | | | | | |
|---|---|---|---|---|---|
| 2,209,202 A | * | 7/1940 | Horne | ........................ | 426/587 |
| 2,223,277 A | * | 11/1940 | Wilt | ........................ | 426/587 |
| 2,490,599 A | * | 12/1949 | Otting | ........................ | 426/587 |
| 2,501,445 A | * | 3/1950 | Hoecker | ........................ | 426/587 |
| 2,565,085 A | * | 8/1951 | Peebles | ........................ | 426/587 |
| 2,570,231 A | * | 10/1951 | Hansen | ........................ | 426/330.2 |
| 2,886,450 A | * | 5/1959 | Stewart | ........................ | 426/587 |
| 3,027,257 A | * | 3/1962 | Shenkenberg | ........................ | 426/285 |
| 3,615,659 A | * | 10/1971 | Weber | ........................ | 426/584 |
| 3,615,674 A | * | 10/1971 | Bass et al. | ........................ | 426/250 |
| 4,081,568 A | * | 3/1978 | Bracco | ........................ | 426/584 |
| 4,235,939 A | * | 11/1980 | Kimberly, Sr. | ........................ | 426/549 |
| 4,744,992 A | * | 5/1988 | Mitchell et al. | ........................ | 426/29 |
| 4,894,242 A | * | 1/1990 | Mitchell et al. | ........................ | 426/29 |
| 4,948,616 A | * | 8/1990 | Iijima et al. | ........................ | 426/587 |
| 5,223,299 A | * | 6/1993 | Dalan et al. | ........................ | 426/587 |
| 5,498,408 A | * | 3/1996 | Oltra et al. | ........................ | 424/78.01 |
| 5,609,895 A | * | 3/1997 | Takubo | ........................ | 426/28 |
| 5,912,040 A | * | 6/1999 | Girsh | ........................ | 426/583 |
| 6,059,145 A | * | 5/2000 | Stratton et al. | ........................ | 222/78 |
| 6,063,433 A | * | 5/2000 | Benward et al. | ........................ | 426/580 |
| 6,265,001 B1 | * | 7/2001 | Nam et al. | ........................ | 426/29 |
| 2001/0002269 A1 | * | 5/2001 | Zhao | ........................ | 426/112 |
| 2001/0022986 A1 | * | 9/2001 | Grish | ........................ | 426/583 |
| 2002/0018830 A1 | * | 2/2002 | Whalen | ........................ | 426/28 |

OTHER PUBLICATIONS

Derhak, Dean, "Horchata de Almendra", www.xmission.com.
Lockman, Wendy, "Horchata de Arroz—Cold Rice Drink", www.soar.berkeley.edu.

* cited by examiner

Primary Examiner—Carolyn Paden
(74) Attorney, Agent, or Firm—Emrich & Dithmar

(57) ABSTRACT

A grain based dairy beverage composition and a process for making the beverage is described. The beverage includes the ingredients sugar, evaporated milk, rice flour, chocolate milk powder and water. Optional ingredients include condensed milk and flavors. The beverage possesses an adequate shelf life to permit mass distribution to consumers.

13 Claims, 1 Drawing Sheet

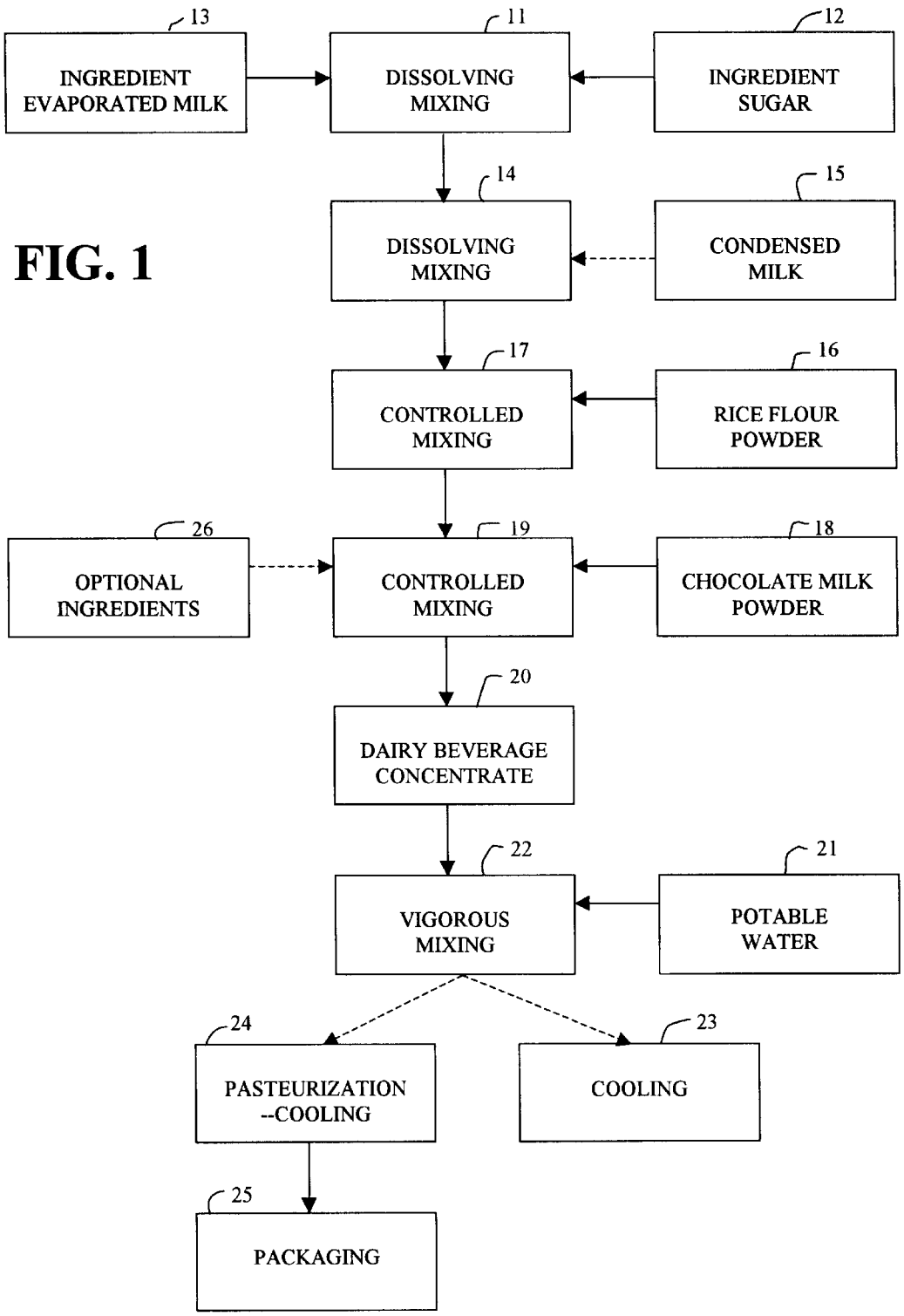

GRAIN BASED DAIRY BEVERAGE

BACKGROUND OF THE INVENTION

The present invention relates to the field of grain based dairy beverages produced from natural foodstuffs. More specifically, the present invention relates to a process for making from rice flour, sugar, chocolate powdered milk, evaporated milk, condensed milk and water a grain based dairy beverage which possesses excellent shelf life and stability while providing a pleasant tasting and flavored beverage.

The popularity of dairy based beverages for consumption by consumers has resulted in a rice based dairy beverage, commonly known as "horchata". Standard recipes and components of a "horchata" beverage generally consist of long grain rice, milk, sugar, vanilla, cinnamon, fresh fruit in various forms and water. However, such prior art recipes do not provide a dairy based beverage which possesses an adequate shelf life and stability. Therefore, such recipes result in a beverage which is unable to be mass distributed to the consuming pubic. Also, such prior art recipes of the "horchata" require, during the manufacture thereof, passing the blended components through a sieve to filter the solid components from the liquid. Accordingly, such recipes provide a beverage that separates within one to two days of the date of preparation. Additionally, such prior art recipes contain ingredients which prevent and block the benefits of combining such recipes with natural flavors to provide flavored dairy based beverages. Thus, such prior art recipes of dairy based beverages have not been manufactured in consumable form for sale to the consuming public.

SUMMARY OF THE INVENTION

One object of the present invention is to provide an improved grain based dairy beverage.

Another object of the present invention is to provide a grain based dairy beverage which exhibits extended shelf life and which is readily manufactured for consumption by the consumer.

A further object of the present invention is to provide a novel method of manufacturing a grain based dairy beverage which eliminates the step of filtering the blended components.

Still another object of the present invention is to provide a novel method of manufacturing a grain based dairy beverage which is storage stable and exceeds the shelf life of prior art grain based dairy beverages.

Yet another object of the present invention is to provide a grain based dairy beverage which may be combined with a variety of natural flavors to provide a smooth tasting flavored beverages.

The grain based dairy beverage in accordance with the present invention provides a dairy beverage with contains between about 0.45–0.75 percent by weight rice flour, about 0.15 percent by weight chocolate milk powder, between about 7.5–9.0 percent by weight sugar, between about 4.8–6.0 percent by weight evaporated milk and between about 3.6–4.5 percent by weight sweetened condensed milk, with the remainder of the beverage consisting of potable water. The above-specified composition or recipe for preparing the grain based dairy beverage in accordance with the present invention eliminates the need of common ingredients such as cinnamon or vanilla, from known prior art "horchata"-type recipes, which substantially enhances the smooth taste of the consumable beverage, as well as permits combining the dairy beverage with natural flavors to provide a variety of flavored beverages.

The utilization of evaporated milk and condensed milk in the beverage recipe permits the grain based dairy beverage to exhibit excellent shelf life as well as stability after preparation. For example, after the step of pasteurization, the dairy beverage may be bottled and stored under refrigeration for a period of between about 2–3 weeks before breakdown occurs in the beverage. Such an extended shelf life for a grain based dairy beverage substantially minimizes the health problems associated with lactose, allergies or traces of hormones contained in dairy products and facilitates the mass distribution of the beverage to the consuming public.

The method or process of manufacturing the grain based dairy beverage in accordance with the present invention includes the step of placing between about 7.5 to 9.0 percent by weight sugar into a mixing container; and thereafter adding between about 4.8–6.0 percent by weight evaporated milk to the sugar and mixing until the sugar is dissolved therein. Generally, the sugar is not completely dissolved in the evaporated milk and between about 3.6–4.5 percent by weight of sweetened condensed milk is further added to the sugar-evaporated milk composition to provide a composition wherein the sugar is completely dissolved. After the sugar is completely dissolved, about 0.6 percent by weight rice flour, in powdered form, is added to the milk and is mixed until the rice flour is completely dissolved in the composition. In small batches of the recipe, the rice flour is added at one ounce at a time during mixing to ensure proper dilution of the rice flour without the composition clumping together or providing the appearance of coagulating. After the rice flour, sugar and condensed and evaporated milk are completely and fully dissolved, about 0.15 percent by weight of chocolate milk powder is added to the composition and dissolved by mixing into the composition. At this point in time, the mixture has a consistency of heavy cream with an off white color and should not be gritty or grainy upon taste. If the consistency is not uniform, further vigorous mixing is required until the desired consistency is achieved. Finally, between about 78–85 percent by weight potable water is added by mixing to the composition to complete the preparation of the beverage. Thereafter, the composition is cooled to a temperature between 40 and 50° F., if it is desired that the beverage is to be immediately consumed by consumers.

As set forth above, the composition may be immediately served to the consumer. However, if it is desired to store the beverage before the beverage is consumed by the consuming public, then the resultant composition may be pasteurized by heating it to approximately 145° F. for 30 minutes or by the utilization of a flash method of heating to 160° F. for 15 seconds, followed by rapid cooling to below 50° F. This pasteurization treatment renders harmless the lactic acid bacteria within the dairy product, permits bottling and shipping to the consumer under refrigerated conditions, and provides a shelf life of the beverage of between about 2–3 weeks. The invention consists of certain novel features and structural details hereinafter fully described, illustrated in the accompanying drawings, and particularly pointed out in the appended claims, it being understood that the various changes in the details may be made without departing from the spirit, or sacrificing any of the advantages of the present invention.

DESCRIPTION OF THE DRAWINGS

For the purpose of facilitating and understanding the present invention, there is illustrated in the accompanying drawings a preferred embodiment thereof, from an inspection of which, when considered in connection with the following description, the invention, its composition and operation and many of its advantages will be readily understood and appreciated.

FIG. 1 is a flow chart showing the process for producing a grain based dairy beverage in accordance with the present invention.

PREFERRED EMBODIMENT

The process for making the grain based dairy beverage will be described with respect to the steps of making the grain based dairy beverage. In understanding the process for making the beverage, the composition of the grain based dairy beverage in accordance with the present invention will be readily understood. FIG. 1 illustrates a flow chart representing the process for making the grain based dairy beverage in accordance with the present invention. The first step of the process is the addition of sugar 12 to mixing container 11. Next, evaporated milk 13 is slowly added with suitable mixing to dissolve the sugar 12. The amount of sugar that should be present in the grain based dairy beverage ranges between about 7.5–9.0 percent by weight sugar relative to the final overall beverage composition. It is generally desired that the range of sugar used in the recipe be closer to the lower end of the range of sugar because of the difficulty in dissolving the sugar in the evaporated milk. The evaporated milk, which is within the range of about 4.8–6.0 percent by weight of the overall beverage composition, is added to the sugars. The sugar 12 is positioned within the mixing container 11 and the ingredient evaporated milk 13 is added to the sugar while mixing occurs to dissolve the sugar. Generally, after extended mixing, it is found that it is necessary to supplement the evaporated milk with a condensed milk 15 which is added to the dissolving mixing container 11. After the sugar is completely dissolved in the evaporated and condensed milk, to provide the sugar milk solution, rice flour 16 is added to the dissolved solution, and a controlled blending/mixing 17 occurs until all the rice flour is completely dissolved in the composition. Importantly, the rice flour is added to the composition in increments of 20–30 percent of the total amount of rice flour to ensure proper dilution and mixing of the rice flour without the composition lumping together or forming lumps therein which would provide an unsatisfactory beverage base. After the rice flour, sugar, condensed milk and evaporated milk are completely and fully dissolved and a uniform consistency is obtained in the container 17, about 0.15 chocolate milk powder 18 is slowly added to the composition with dispersing/mixing until the chocolate milk powder is fully dissolved in the container 19. This provides the dairy beverage concentrate 20. The dairy beverage concentrate has a consistency of heavy cream with an off-white color and should not be gritty or grainy upon taste. If the consistency is not uniform, further vigorous mixing is required until the desired consistency is achieved.

Finally, between about 78–85 percent by weight potable water 21 is added to the container containing the dairy beverage concentrate 20 with vigorous mixing 22 to dilute the beverage concentrate composition to complete the preparation of the grain based dairy beverage. The water should be of beverage quality to prevent adverse odor, taste or appearance of the beverage. Also, the water should have a neutral pH. After the vigorous mixing, the dairy based beverage may either be cooled 23 to a temperature between about 40–50° F. for immediate consumption or the freshly prepared grain based dairy beverage may be pasteurized 24 and then cooled for subsequent packaging 25. The packaging may be either into sterile bottles, cartons, or plastic bottles for refrigeration and shipment to the consumer.

The pasteurization may be obtained by heating the grain based dairy beverage to approximately 145° F. for 30 minutes or by the utilization of a flash method of heating to 160° F. for 15 seconds, followed by the rapid cooling to between about 40–50° F. The pasteurization treatment and process renders harmless the lactic acid bacteria within the grain based dairy product, permits bottling and shipping to the consumer under refrigerated conditions and provides a shelf life of the beverage of between about 2–3 weeks.

As shown in FIG. 1, after the controlled dispersing/mixing of the chocolate milk powder to the grain based sugar-milk solution 19, it is within the scope of the present invention that optional ingredients 26, such as flavors, may be added to the solution to provide a flavored beverage concentrate. Various type flavors may be added such as chocolate, coffee, banana, strawberry, cherry, orange, cinnamon, and/or vanilla in the range of between about 0.15–0.45 percent by weight flavor to the dairy beverage concentrate. Indeed, it is within the scope of the present invention that blends of flavor may be used as optional ingredients. After the controlled mixing 19 to provide a uniform and consistent dairy beverage concentrate 20, potable water is added to the flavored dairy beverage concentrate and under vigorous mixing 22, the resultant flavored beverage is obtained. Again, either the beverage may be cooled for immediate consumption, or it may be pasteurized and then cooled, as set forth above, for subsequent packaging for shipment to the consumer.

The grain based dairy beverage possesses a pH of between about 6.2 to 7.3. It appears that the higher the pH value, the longer the dairy beverage may be bottled and stored under refrigeration before breakdown occurs.

EXAMPLE 1

8.25 weight percent sugar, 5.4 weight percent evaporated milk, 4.1 weight percent condensed milk, 0.6 weight percent rice flour, 0.15 weight percent chocolate milk powder, and 81.64 weight percent potable water were mixed according to the process, set forth above, and provided a dairy based beverage having a smooth taste, having a shelf life of at least two weeks, and having an uniform consistency. Also, the method provides a cost efficient process for combining the ingredients and to provide the extended shelf life associated with the product as the result of pasteurization. This facilitates the mass distribution of the beverage to the consuming public.

It is understood that I have disclosed both a process and a product for a grain based dairy beverage which may be immediately consumed or which may be pasteurized and packaged for distribution to the consuming public.

I claim:

1. A grain based dairy beverage, comprising the following ingredients blended in a homogeneous solution:
   between about 7.5–9.0 weight percent sugar;
   between about 4.8–6.0 weight percent evaporated milk;
   between about 3.6–4.5 weight percent condensed milk;
   between about 0.45–0.75 weight percent rice flour;
   between about 0.075–0.225 weight percent chocolate milk powder; and
   between about 78–85 weight percent water.

2. The grain based dairy beverage in accordance with claim 1, wherein the pH of the grain based dairy beverage ranges between 6.2 and 7.5.

3. The grain based dairy beverage in accordance with claim 1, further including a flavor ingredient in an amount of between about 0.15–0.45 weight percent of said beverage.

4. The grain based dairy beverage in accordance with claim 3, wherein said flavor ingredient is selected from a group consisting of chocolate, coffee, banana, strawberry, cherry, orange, cinnamon and vanilla.

5. The grain based dairy beverage in accordance with claim 4, wherein said flavor ingredient may consist of blended flavors selected from said group.

6. The grain based dairy beverage in accordance with claim 1, wherein said weight percent chocolate milk powder is about 0.15.

7. The grain based dairy beverage in accordance with claim 1, wherein said weight percent evaporated milk is about 5.4.

8. The grain based dairy beverage in accordance with claim 1, wherein said weight percent condensed milk is about 4.1.

9. The grain based dairy beverage in accordance with claim 1, wherein said weight percent rice flour is about 0.6.

10. The grain based dairy beverage in accordance with claim 1, wherein said weight percent sugar is about 8.2.

11. A process for preparing a grain-based dairy beverage, including the steps of dissolving/mixing sugar in evaporated milk to provide a sugar-milk solution;

blending/mixing rice flour powder to said sugar-milk solution to provide rice-flour-milk solution;

dispersing/mixing chocolate milk powder to said rice-sugar-evaporated milk solution to provide a dairy beverage concentrate;

diluting said dairy beverage concentrate with potable water to provide the grain based dairy beverage; and cooling said grain based dairy beverage to between about 40–50° F.

12. The process for preparing a grain-based dairy beverage in accordance with claim 6, wherein said dissolving/mixing step further includes the addition of condensed milk to said evaporated milk to provide said sugar-milk solution.

13. The process for preparing a grain based dairy beverage in accordance with claim 7, wherein said process includes the step of pasteurization of said grain based dairy beverage prior to the step of cooling.

* * * * *